United States Patent
Kumar et al.

(10) Patent No.: US 10,372,495 B2
(45) Date of Patent: Aug. 6, 2019

(54) CIRCUITS AND METHODS PROVIDING THREAD ASSIGNMENT FOR A MULTI-CORE PROCESSOR

(71) Applicant: QUALCOMM INCORPORATED, San Diego, CA (US)

(72) Inventors: Akash Kumar, Hyderabad (IN); Ankita, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 154 days.

(21) Appl. No.: 15/435,630

(22) Filed: Feb. 17, 2017

(65) Prior Publication Data

US 2018/0239641 A1    Aug. 23, 2018

(51) Int. Cl.
*G06F 9/46* (2006.01)
*G06F 9/48* (2006.01)
*G06F 9/50* (2006.01)

(52) U.S. Cl.
CPC .......... *G06F 9/4893* (2013.01); *G06F 9/5027* (2013.01)

(58) Field of Classification Search
None
See application file for complete search history.

(56) References Cited

U.S. PATENT DOCUMENTS

| | | | |
|---|---|---|---|
| 7,886,172 B2 | 2/2011 | Bose et al. | |
| 8,296,773 B2 | 10/2012 | Bose et al. | |
| 8,832,479 B2 | 9/2014 | Elnozahy et al. | |
| 9,043,795 B2 | 5/2015 | Morrow et al. | |
| 9,424,092 B2 | 8/2016 | Singh et al. | |
| 9,442,559 B2 | 9/2016 | Biswas et al. | |
| 2007/0260895 A1* | 11/2007 | Aguilar, Jr. | G06F 1/206 713/300 |
| 2011/0271283 A1* | 11/2011 | Bell, Jr. | G06F 9/5094 718/102 |
| 2015/0095674 A1* | 4/2015 | Sasanka | G06F 12/0223 713/322 |
| 2015/0178138 A1* | 6/2015 | Saha | G06F 9/5094 718/104 |
| 2015/0338902 A1 | 11/2015 | Mittal et al. | |
| 2017/0083383 A1* | 3/2017 | Rider | G06F 9/5094 |
| 2018/0143862 A1 | 5/2018 | Saeidi et al. | |

* cited by examiner

*Primary Examiner* — Gregory A Kessler
(74) *Attorney, Agent, or Firm* — Haynes & Boone, LLP

(57) ABSTRACT

A system includes: a system on chip (SOC) having a plurality of cores; a first memory storing operating parameters for each of the cores; and a second memory storing historical use data for an application, wherein processing threads of the application are assigned to one or more of the plurality of cores based, at least in part, on the operating parameters for each of the cores and the historical use data.

30 Claims, 8 Drawing Sheets

|  | Minimum Voltage | Maximum Voltage | Minimum Frequency | Maximum Frequency | Distance from GPU |
|---|---|---|---|---|---|
| Core0 | 1.8 V | 2.2 V | 100 MHz | 300 MHz | 2 units |
| Core1 | 2.0 V | 2.5 V | 200 MHz | 350 MHz | 1.5 units |
| Core2 | 2.5 V | 3.0 V | 300 MHz | 400 MHz | 1 unit |

| | Minimum Voltage | Maximum Voltage | Minimum Frequency | Maximum Frequency | Thermal gradient | CPU Core Usage | CPU HW Thread Usage | GPU Usage | HW Accelerator Usage |
|---|---|---|---|---|---|---|---|---|---|
| Application X | 1.8 V | 2.2 V | 50 MHz | 300 MHz | 1°C/minute | 1 | 2 | N | N |
| Application Y | 2.5 V | 3.0 V | 200 MHz | 350 MHz | 3°C/minute | 2 | 3 | Y | Y |

CIRCUITS AND METHODS PROVIDING THREAD ASSIGNMENT FOR A MULTI-CORE PROCESSOR

TECHNICAL FIELD

The present application relates, generally, to assigning processing threads to cores of a multi-core processor and, more specifically, to assigning processing threads based at least in part on operating parameters for each of the cores and historical use data of an application.

BACKGROUND

A conventional computing device (e.g., smart phone, tablet computer, etc.) may include a system on chip (SOC), which has a processor and other operational circuits. Specifically, an SOC in a wireless device may include a processor chip within a package, where the package is mounted on a printed circuit board (PCB) internally to the phone. The device includes an external housing and a display, such as a liquid crystal display (LCD). A human user when using the device physically touches the external housing and the display.

As the SOC operates, it generates heat. In one example, the SOC within a smart phone may reach temperatures of 80° C.-100° C. Furthermore, conventional wireless devices may not include fans to dissipate heat. During use, such as when a human user is watching a video on a device, the SOC generates heat, and the heat is spread through the internal portions of the device to the outside surface of the device. Conventional smart phones include algorithms to control both the SOC temperature and the temperature of an outside surface of the device by reducing a frequency of operation of the SOC when a temperature sensor on the SOC reaches a threshold level. This may be referred to as thermal throttling or thermal mitigation. Thermal throttling may prevent heat damage to internal components of the device or discomfort to user touching the device, but at a cost to performance.

Demand for more performance in computing devices is increasing. One industry response to this demand has been the addition of more processor cores on an SOC to improve performance. Regardless of the number of processor cores, most conventional user applications are written so that processing is concentrated in just two cores (e.g., dual processor core intensive), hence adding more processor cores may not directly translate into better user experience/performance. And while some conventional systems may assign processing threads to CPU cores based on a temperature reading being below a certain threshold, such strategy may be hampered by the use of only a few (e.g., two) cores. Also, simply assigning processing threads to CPU cores with lower temperatures is a reactive process that may still incur thermal throttling from time to time.

Further, some conventional applications are written to employ the resources of a graphics processing unit (GPU) rather than just relying on a central processing unit (CPU). However, heavy use of a GPU may result in generation of heat that affects surrounding processing units on the SOC, such as cores of the CPU, a modem, a digital signal processor (DSP), and the like. Furthermore, different applications may use different resources and have different operating specifications. Therefore, there is a need in the art for computing systems employing multiple processing units to address heat generated by one processing unit that affects another processing unit while taking into account resource usage by a given application.

SUMMARY

Various embodiments are directed to circuits and methods that assign processing threads to cores of a multi-core processor based at least in part on operating parameters for the cores at historical use data for a given application.

According to one embodiment, a system includes: a system on chip (SOC) having a plurality of cores; a first memory storing operating parameters for each of the cores; and a second memory storing historical use data for an application; wherein processing threads of the application are assigned to one or more of the plurality of cores based, at least in part, on the operating parameters for each of the cores and the historical use data.

According to another embodiment, a method includes: storing in a first memory operating parameters for each of a plurality of cores of a system on chip (SOC); storing in a second memory historical use data for an application; accessing the first memory and the second memory in response to operation of the application; and assigning a plurality of processing threads of the application to a first core of the plurality of cores based, at least in part, on operating parameters of the first core and on the historical use data of the application.

According to another embodiment, a non-transitory machine readable medium having stored thereon instructions for performing a method, the medium comprising machine executable code which when executed by at least one processor, causes the at least one processor to: store in a first memory operating parameters for each of a plurality of cores of a system on chip (SOC); store in a second memory historical use data for an application; access the first memory and the second memory in response to operation of the application; and assign a plurality of processing threads of the application to a first core of the plurality of cores based, at least in part, on operating parameters of the first core and on the historical use data of the application.

According to another embodiment, a wireless device includes: a system on chip (SOC) having a plurality of cores; means for storing operating parameters for each of the cores; means for storing historical use data for an application; and means for assigning processing threads of the application to one or more of the plurality of cores based, at least in part, on the operating parameters for each of the cores and the historical use data.

BRIEF DESCRIPTION OF THE DRAWINGS

FIG. 4 is an illustration of an example data structure storing operating parameters for a plurality of cores, according to one embodiment.

FIG. 5 is an illustration of an example data structure storing historical use data for a plurality of applications, according to one embodiment.

DETAILED DESCRIPTION

Figure 1:
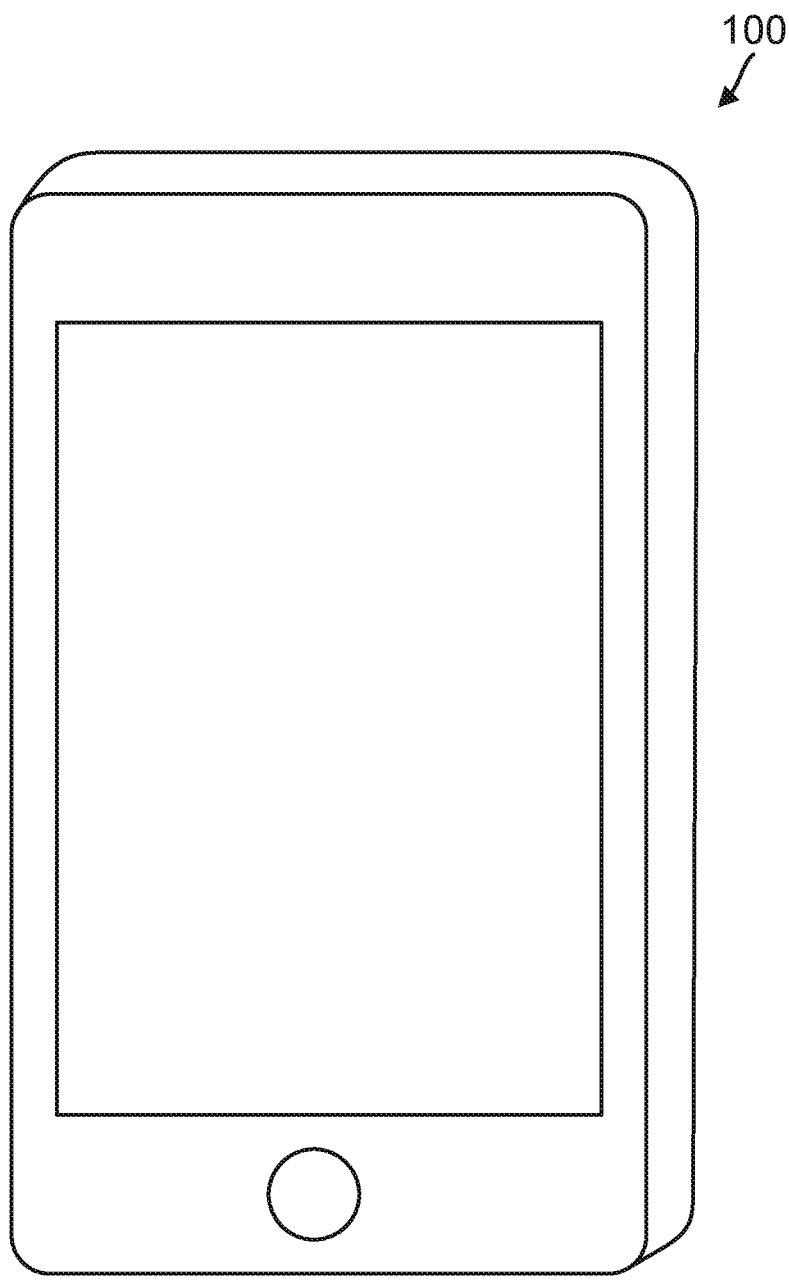
FIG. 1 is an illustration of an example computing device that may perform a method according to various embodiments.

Various embodiments provide for intelligent thread assignment within a multi-core processor. In one example, the principles described herein may be included in a system on chip (SOC) that has a graphics processing unit (GPU) and a multi-core central processing unit (CPU), where each of the GPU and the CPU have temperature sensors providing temperature information to a thread scheduler.

For example, the thread scheduler may include one or more algorithms as part of a kernel or even higher up in an operating system (OS) stack. In this example, the thread scheduler may assign threads to cores of the CPU. Continuing with the example, the SOC includes one or more storage devices (e.g., non-volatile memory, such as flash memory) including a first memory that stores operating parameters for each of the cores and a second memory that stores historical use data for a plurality of applications. The first and second memory may be on a same memory device or on different memory devices. The processing threads of a given application may be assigned to one or more of the cores based, at least in part, on the operating parameters for each of the cores and the historical use data.

For instance, one example is proactive in its assignment of software threads to cores based at least in part on knowledge of the characteristics of an application that may be currently running or just opened on the SOC. For example, a particular videogame application may be known by the SOC to have requirements for frequency of operation as well as be known for causing a certain amount of heat dissipation at the GPU and at the CPU cores—this is one example of historical use data. This information may be stored in a table or other memory structure by the SOC. Further, information regarding resource usage may be used to update the information stored in the memory structure. When a user opens the application, the SOC accesses the table from memory and determines an acceptable selection of processing cores within the CPU, and hardware threads within those cores to handle execution of the application.

Some cores may have different minimum operating frequencies than other cores, and as a general rule, cores that operate at lower frequencies may use less power because they may operate at slightly lower voltages than their higher-frequency counterparts. Accordingly, one operating parameter that may be taken into account is a minimum operating frequency of a given core, so that the thread scheduler may schedule processing threads to a core or cores of the CPU that have a minimum operating frequency acceptable to run the application. Continuing with the example, the thread scheduler may avoid scheduling software threads to cores having higher minimum operating frequencies, when other cores are available having lower minimum operating frequencies that are still acceptable to the particular application.

Continuing with the example, the thread scheduler may also take into account distance of a particular core from an expected hot spot (or currently detected hot spot) when assigning software threads to hardware threads. For instance, if past use of the videogame application has trained the SOC to know that a particular hot spot occurs in a particular physical place in the SOC, then the thread scheduler may select cores farther away from the known hot spot.

Figure 6:
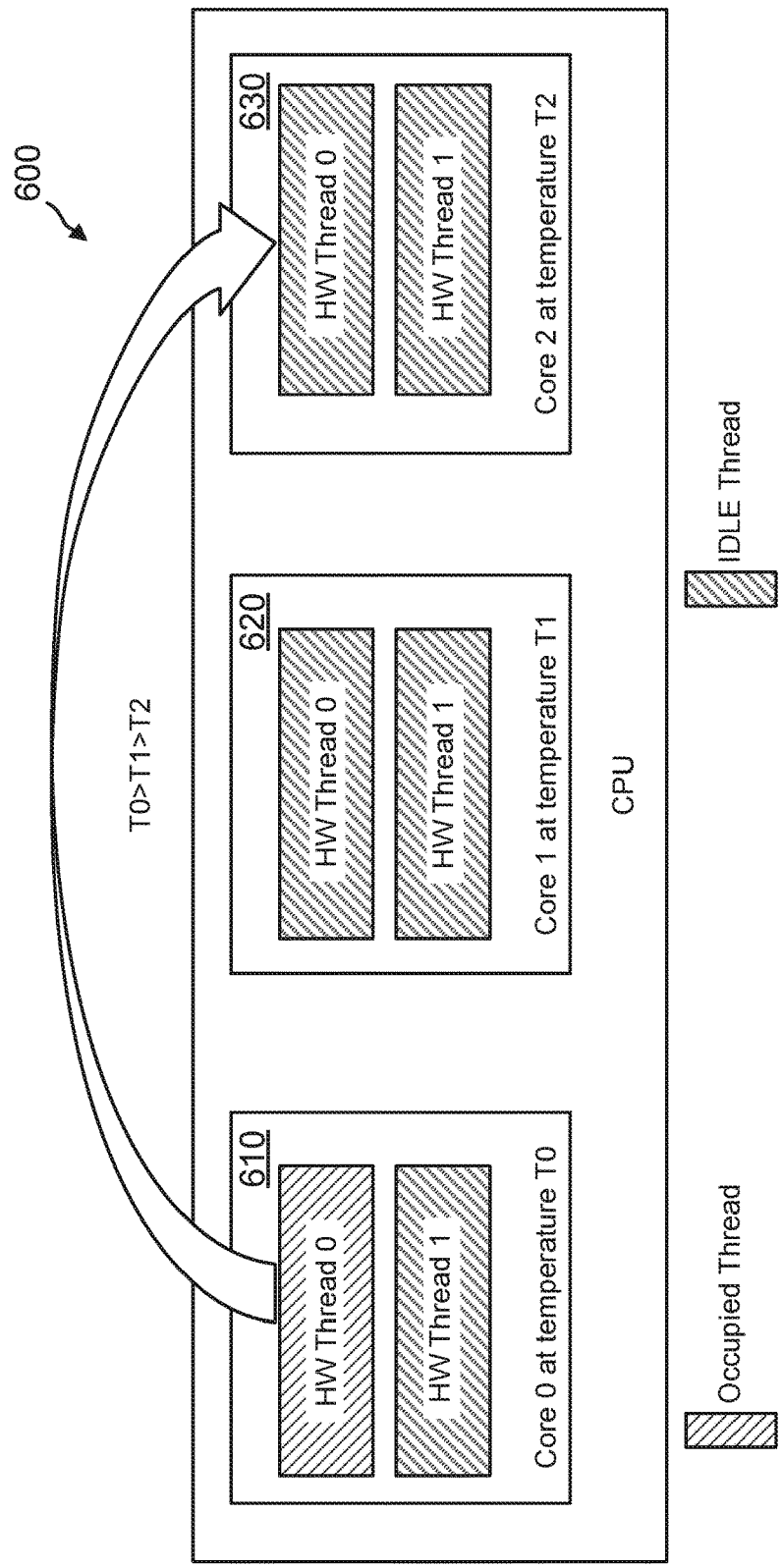
FIGS. 6 and 7 are illustrations of reassignment of processing threads among a plurality of hardware threads, according to one embodiment.
Figure 7:
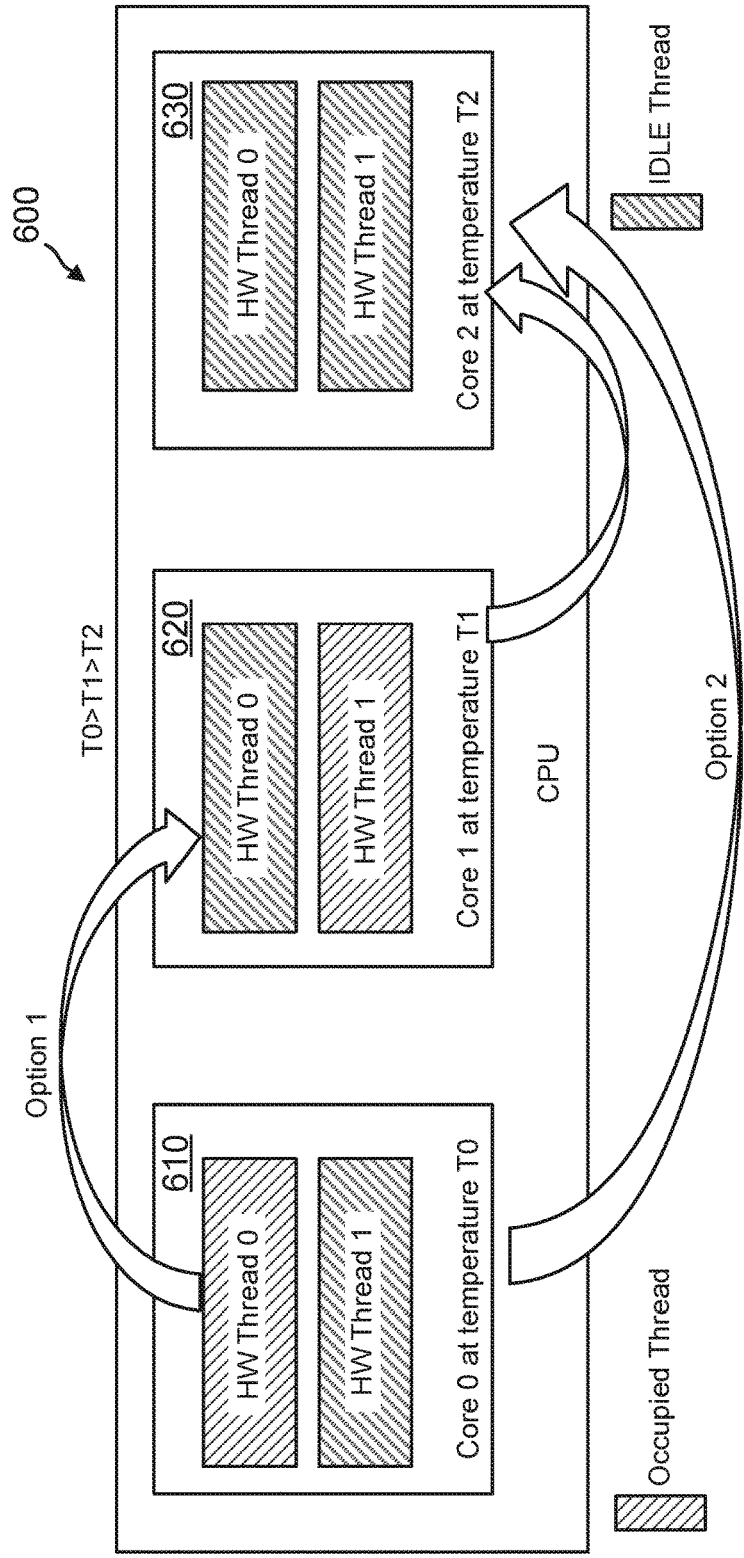

Of course, the scope of embodiments includes reassigning existing software threads to other cores based on any or all of the operating parameters discussed herein. For instance, software threads may be "hopped" from one core to another on a regular basis, such as during rebalancing, as new applications are opened, as new hot spots are detected, and the like. FIGS. 6 and 7 provide examples of thread hopping.

Various embodiments may be performed by hardware and/or software in a computing device. For instance, some embodiments include hardware and/or software algorithms performed by a processor, which can be part of the SOC, in a computing device as the device operates. Various embodiments may further include nonvolatile or volatile memory in an integrated circuit chip in the computing device to store the tables having operating parameters for the cores and historical use data for applications.

Various embodiments may include one or more advantages over conventional systems. For instance, various embodiments herein may be proactive, taking into account historical use data from known applications to schedule software threads by selecting a first core having a minimum operating frequency (or voltage) above an application minimum operating frequency (or voltage) of the historical use data and below a minimum operating frequency (voltage) associated with a second core. Such proactive use of the historical data from applications may reduce the use of thermal throttling, thereby increasing performance of a user's mobile device. Various embodiments may further update historical use data of the applications so that subsequent uses of those applications may benefit from relevant statistics.

Various embodiments may further take into account physical location of a core to which a thread might be scheduled. Such feature may allow the system to avoid scheduling threads near expected hot spots and to instead schedule threads relatively further away from potential hot spots, thereby avoiding raising temperatures above temperature thresholds and further avoiding thermal throttling.

FIG. 1 is a simplified diagram illustrating an example computing device 100 in which various embodiments may be implemented. In the example of FIG. 1, computing device 100 is shown as a smart phone. However, the scope of embodiments is not limited to a smart phone, as other embodiments may include a tablet computer, a laptop computer, or other appropriate device. In fact, the scope of embodiments includes any particular computing device, whether mobile or not. Embodiments including battery-powered devices, such as tablet computers and smart phones may benefit from the concepts disclosed herein. Specifically, the concepts described herein provide techniques to manage heat and balance processing load in response to historical use data of applications and operational parameters of processor cores.

Figure 2:
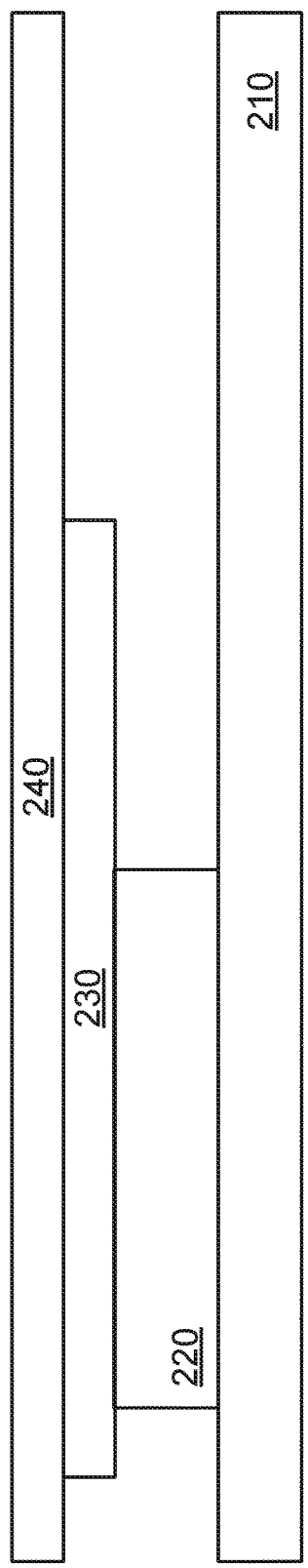
FIG. 2 is an illustration of an example internal architecture of the computing device of FIG. 1, according to one embodiment.

FIG. 2 illustrates an example arrangement of some external and internal components of computing device 100, according to one embodiment. In this example, the processing components of the computing device are implemented as a SOC within a package 220, and the package 220 is mounted to a printed circuit board 210 and disposed within the physical housing of computing device 100. A heat spreader and electromagnetic interference (EMI) layer 230 is disposed on top of SOC package 220, and the back cover 240 is disposed over the layer 230. The package 220 including the processor can be mounted in a plane parallel to a plane of the display surface and a plane of the back cover 240.

Although not shown in FIG. 2, it is understood that computing device 100 may include other components, such as a battery, other printed circuit boards, other integrated circuit chips and the chip packages, and the like. The battery, the printed circuit boards, and the integrated circuit chips are disposed within the computing device 100 so that they are enclosed within the physical housing of the computing device 100.

Figure 3:
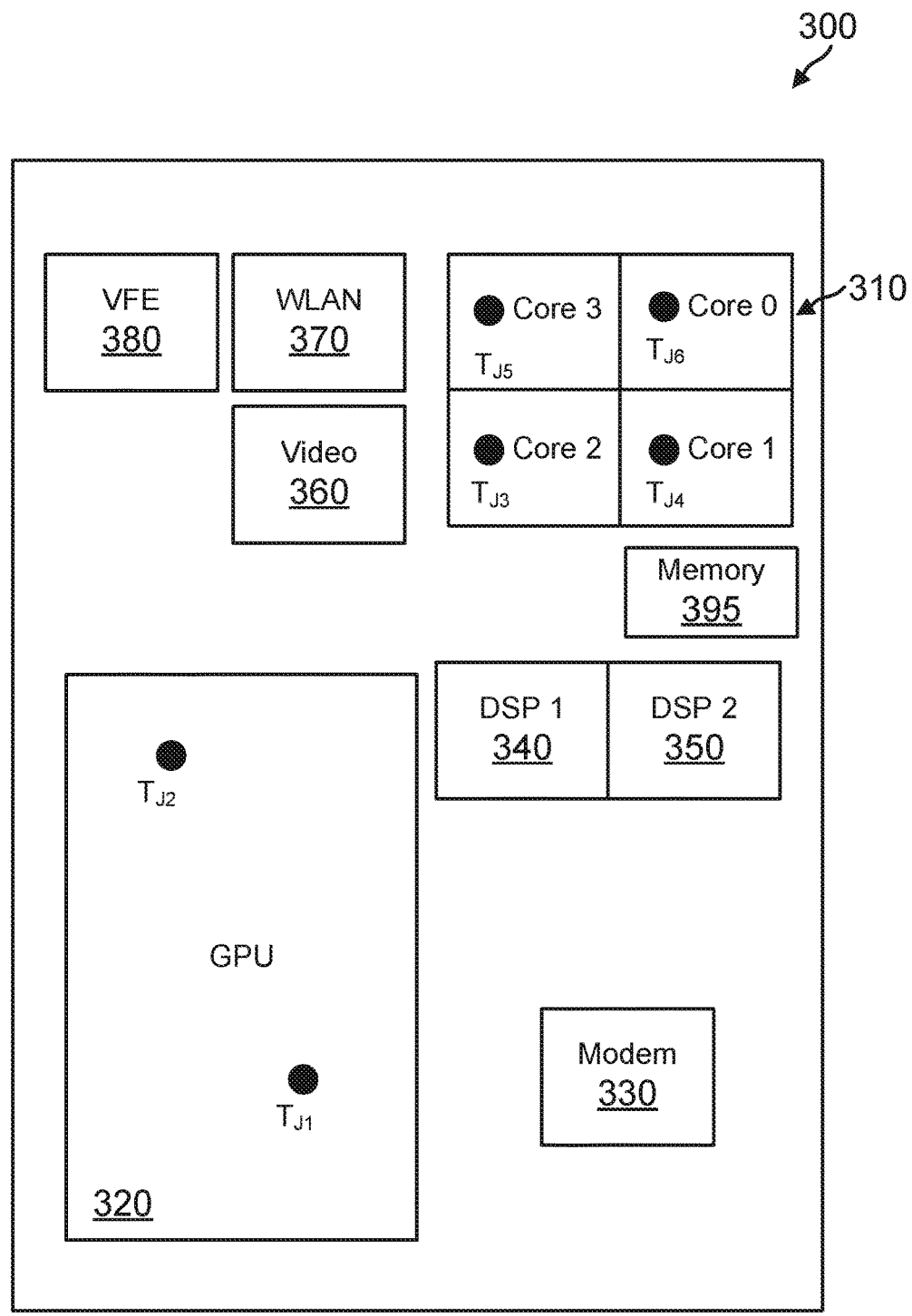
FIG. 3 is an illustration of an example SOC that may be included in the computing device of FIG. 1, and may itself include a processing unit assigning threads, according to one embodiment.

FIG. 3 is an illustration of example SOC 300, which may be included within package 220 of the embodiment of FIG. 2, according to one embodiment. In this example, SOC 300 is implemented on a semiconductor die, and it includes multiple system components 310-380. Specifically, in this example, SOC 300 includes CPU 310 that is a multi-core general purpose processor having the four processor cores core 0-core 3. Of course, the scope of embodiments is not limited to any particular number of cores, as other embodiments may include two cores, eight cores, or any other appropriate number of cores in the CPU 310. SOC 300 further includes other system components, such as a first DSP 340, a second DSP 350, a modem 330, GPU 320, a video subsystem 360, a wireless local area network (WLAN) transceiver 370, and a video-front-end (WE) subsystem 380, and memory 395.

CPU 310 is a separate processing unit from GPU 320 and separate from the DSPs 340 and 350. Furthermore, CPU 310 is physically separate from GPU 320 and from the DSPs 340, 350, as indicated by the space between those components in the illustration of FIG. 3. Such space between the components indicates portions of the semiconductor die that are physically placed between the processing units 310, 320, 340, 350. The rectangles indicating each of the processing units 310, 320, 340, 350 provide an approximation of the boundaries of each of those processing units within the semiconductor die.

Further in this example, CPU 310 executes computer readable code to provide the functionality of a thread scheduler. For instance, in this example the thread scheduler includes firmware that is executed by one or more of the cores of CPU 310 as part of an operating system kernel. Of course, various embodiments may implement a thread scheduler in other appropriate ways, such as part of a higher-level component of an operating system stack. Operation of the thread scheduler is explained in more detail below.

The placement of the components on the SOC 300 may have an effect on the performance of the components, particularly their operating temperatures. When the SOC 300 is operational, the various components 310-380 generate heat, where that heat dissipates through the material of the semiconductor die. The operating temperature of a component may be affected by its own power dissipation (self-heating) and the temperature influence of surrounding components (mutual-heating). A mutual heating component may include anything on the SOC 300 that produces heat. Thus, the operating temperature of each component on the SOC 300 may depend on its placement with respect to heat sinks and to the other components on the SOC 300 generating heat. For example, the CPU 310 and the GPU 320 may both generate significant heat when a graphics-intensive application is executing. Where these components are placed close together, one may cause the performance of the other to suffer due to the heat it produces during operation.

Thus, as shown in FIG. 3, the CPU 310 and the GPU 320 may be placed such that they are far enough from each other that the heat exposure of either component to the other may be reduced. Nevertheless, some processor cores (e.g., Core 2) may be positioned closer to the GPU 320, and thus more affected by heat generated by the GPU than processor cores located farther away (e.g., Core 0).

CPU 310 in this example also includes thermal mitigation algorithms, which measure temperature throughout the SOC 300 and may reduce an operating voltage or an operating frequency of one or more components in order to reduce heat generated by such components when a temperature sensor indicates a hot spot. Accordingly, SOC 300 includes temperature sensors located throughout. Example temperature sensors are shown labeled $T_{J1}$-$T_{J6}$. Temperature sensors $T_{J1}$ and $T_{J2}$ are implemented within GPU 320, whereas the temperature sensors labeled $T_{J3}$-$T_{J6}$ are implemented within CPU 310. The scope of embodiments is not limited to any particular placement for the temperature sensors, and other embodiments may include more or fewer temperature sensors and temperature sensors in different places. For instance, other embodiments may include temperature sensors at any of components 330-380, on a PCB, or other appropriate location. The temperature sensors themselves may include any appropriate sensing device, such as a ring oscillator.

$T_J$ stands for junction temperature, and at any given time a junction temperature refers to a highest temperature reading by any of the sensors. For instance, if the temperature sensor $T_{J2}$ reads the highest temperature out of the six temperature sensors, then the value of that temperature reading is the junction temperature. As SOC 300 operates, the junction temperature may change, and the particular sensor reading the junction temperature may change.

In this example, CPU 310 provides functionality to control the heat produced within SOC 300 by thermal mitigation algorithms, which monitor the temperatures at the various sensors, including a junction temperature, and take appropriate action. For instance, one or more thermal mitigation algorithms may track the temperatures at the temperature sensors and reduce a voltage and/or a frequency of operation of any one of the components 310-380, or even an individual CPU core, when the junction temperature meets or exceeds one or more set points or thresholds. Additionally, in the embodiment of FIG. 3, the thread scheduler uses the information from the temperature sensors when determining which core (e.g., Core 0-Core 3) should be assigned a given processing thread.

During normal operation of the computing device 100 (FIG. 1), the user may interact with the computing device 100 to open or close one or more applications, to consume content such as video or audio streams, or other operations. In one example in which a user opens an application, such application may be associated with tens or hundreds of processing threads that would then be placed in various queues of the processing components 310, 320, 340, 350. Each of the cores Core 0-Core 3 includes its own processing queue, and any one of the cores Core 0-Core 3 may receive processing threads as well. The thread scheduler is responsible for placing the processing threads in the various queues according to a variety of different criteria. As explained in more detail below, the various criteria may include the information stored in tables 400 and 500 of FIGS. 4 and 5.

In various embodiments, the SOC 300 stores tables 400 and 500 (FIGS. 4 5) in nonvolatile memory 395 that is available to the various processing units 310-380, or at least available to CPU 310 that is executing a kernel or other operating system functionality. The thread scheduler is programmed to access addresses in the nonvolatile memory 395 that correspond to one or both of tables 400 and 500 when appropriate. The information of Table 400 may be written to the nonvolatile memory 395 during manufacture of the computing device 100 or even following manufacture of SOC 300 but before manufacture of computing device 100 itself. Specifically, the information in Table 400 may be known from the design phase of the SOC 300 and thus may be written to the nonvolatile memory 395 as early or as late as is practicable. The information in Table 500 may be written during use of the device and rewritten or updated during subsequent use or at other times as appropriate.

In a system that includes thermal mitigation algorithms, a thermal mitigation algorithm may reduce operating voltage or operating frequency for a particular processing core or an entire processing unit in response to detected temperature or temperature increases rising above a programmed limit. Thus, a processor core closest to a heat-generating processing unit would be expected to have a shorter time to mitigation and resulting lower performance Various embodiments may increase time to mitigation for the various processor cores by scheduling threads to reduce temperature or temperature increases from the various processing units.

FIG. 4 is an illustration of an example Table 400 storing entries having operating parameters for multiple cores. FIG. 5 is an illustration of an example Table 500 storing entries having historical use data for multiple applications. The example of FIG. 4 is provided with respect to only three cores for ease of illustration, but it is understood that the concepts described with respect to FIG. 4 may be applied to any appropriate number of cores. For example, the embodiment of FIG. 3 includes four cores of the CPU 310, and Table 400 of FIG. 4 may be adapted for use with four cores by adding a row to accommodate four cores. Table 400 may be stored in a first memory, such as memory 395 of FIG. 3.

Table 400 includes multiple columns, each column for a given operating parameter. In this example, there are five example operating parameters for each of the cores Minimum voltage and maximum voltage indicate minimum operating voltage and maximum operating voltage for a given core. In this example, higher operating voltage correlates with higher operating frequency, as illustrated by the columns for minimum frequency and maximum frequency. For example, Core 0 includes a lower operating voltage range than does Core 1, and Core 0 also includes a lower operating frequency range as well. Core 2 has the highest operating voltage range and a highest operating frequency range out of the three cores. Of course, the values for voltage and frequency are for example only, as the scope of embodiments may include any appropriate operating voltage range and operating frequency range.

Table 400 also includes a column for distance from GPU for each of the cores. It is noted that a given SOC may have a particular layout with respect to the CPU and the GPU such that some of the CPU cores are closer to the GPU than are others. An example is shown at FIG. 3, wherein Cores 3 and 0 are farthest from GPU 320. Such parameter may affect operation of a given core, as core closer to the GPU may be expected to be affected by GPU generated heat more than a core that is further from the GPU. For some applications, the GPU may be a known hot spot, so that such data may be considered hot spot location data.

The example of FIG. 5 is provided with respect to two applications, but it is understood that the scope of embodiments may include historical use data for any appropriate number of applications. The historical use data of Table 500 may include data observed during operation of an application on a computing device, and the historical use data may be updated as different values are observed by an OS kernel or other appropriate algorithm over time. Table 500 may be stored to a second memory, such as memory 395 of FIG. 3. In this example, the first and second memories include a common memory structure (memory 395), although the data from each of the tables may be stored in different memory locations within memory 395. In other embodiments, the first and second memories may be actually physically separate memories. The scope of embodiments may include any appropriate memory structure to store Tables 400 and 500.

Each of the columns in Table 500 includes a particular operating characteristic attributable to a given application. For instance, the first four columns of Table 500 includes minimum and maximum operating voltages and minimum and maximum operating frequencies. In some applications, such as those that include audio or video or more intense data processing may have higher operating voltage requirements and higher operating frequency requirements. By contrast, some applications that may handle primarily text and still images (e.g., messaging applications) may have lower operating voltage requirements and lower operating frequency requirements. Thus in this example, application X may represent a messaging application, as it has a minimum frequency requirement of 50 MHz. On the other hand, application Y may represent a gaming application, as it has a minimum frequency requirement of 200 MHz.

Another column includes thermal gradient, which is represented in this example by degrees Celsius per minute. Thermal gradient may be observed by an OS kernel receiving temperature data from a plurality of temperature sensors, tracking heat spread from a core processing threads of a given application to neighboring cores. In this example, application X uses less processing resources and thus has a lower thermal gradient than does application Y.

Various applications may use a different number of CPU cores. For instance, an application that is particularly processing-intensive may use a larger number of CPU cores than would a less intensive application. Thus, in this example, application X may typically use a single CPU core, whereas application Y may use multiple CPU cores. Core usage may be observed by an OS kernel or other appropriate algorithm and stored to Table 500.

The column for CPU hardware thread usage indicates a number of hardware threads that may typically be used by a given application during operation. In this example, a software thread may include a discrete set of instructions to be executed on a processor. Furthermore, a hardware thread may include a specific hardware portion within a core that has its own memory cache and can be referred to by instruction pointers. A core may have one or more hardware threads, wherein each hardware thread can process instructions in parallel to other hardware threads within the core. A more processing-intensive application may be expected to use more hardware threads than would a less intensive application. Thus, in the example of FIG. 5, application X uses a fewer number of hardware threads than does application Y. Hardware thread usage may be observed by an OS kernel or other appropriate algorithm and stored to Table 500.

Some applications may use the resources of a GPU, whereas other applications may not. For instance, some applications may process images or video and, thus, may be programmed to use a GPU for the images or video. By contrast, other applications, such as messaging applications that may be primarily directed to text, may not be programmed to use a GPU. In this example, application X does not use the GPU, whereas application Y does use the GPU. GPU usage may be tracked by an OS kernel or other appropriate algorithm and stored to Table 500.

Some applications may also benefit from the use of a hardware accelerator, and the rightmost column of Table 500 indicates hardware accelerator usage for a given application. In this example, application X does not use a hardware accelerator, whereas application Y does use the hardware accelerator. Hardware accelerator usage may be tracked by an OS kernel or other appropriate algorithm and stored to Table 500.

In various embodiments, the processing threads of an application are assigned to one or more of the cores based, at least in part, on operating parameters for the cores in Table 400 and the historical use data in Table 500. For instance, when an application is started, a thread scheduler of an OS kernel may choose among the multiple cores when assigning the threads of the application. In this example, the thread scheduler accesses Tables 400 and 500 when choosing among the multiple cores and assigns those threads to reduce or minimize thermal throttling.

Example embodiments may also include reassigning threads from one core to another core, or thread hopping. Thread reassignment may be performed to reduce or minimize thermal throttling and to achieve a desired operating and thermal balance between various cores.

FIG. 6 provides an example for thread hopping, according to one embodiment, that may be performed in a multi-core processor 600 and using information from Tables 400 and 500 of FIGS. 4 and 5. The example of FIG. 6 includes three cores—Core 0 (610), Core 1 (620), and Core 2 (630), though it is understood that the scope of embodiments includes any appropriate number of cores. Also, it is understood that multi-core processor 600 may be included in a SOC having other components, such as memory, GPU, and the like. In other words, the principles described with respect to FIG. 6 may be applied to other chips, including the SOC of FIG. 3.

Consider an example of only one hardware thread 0 on Core 0 being active and rest of the cores in an inactive state. Now it may happen that Core 0 is nearest to the SOC thermal hot spot or in general due to continuous long usage of CPU Core 0, the temperature of this core may be highest. This increases the overall CPU temperature as well.

In the case of FIG. 6, if the temperature of the active core, Core 0, rises above a programmed threshold and becomes greater than the minimum of the temperature on one of the cores by a significant value, the OS kernel may then trigger the hop of the processing thread from hardware thread 0 on Core 0 to one of the hardware threads on Core 2. Such embodiment may take into account a thermal gradient (by accessing Table 500) with respect to the known hot spot and location of a given core (by accessing Table 400), thereby allowing the thread scheduler to use a core least affected by the thermal gradient between the hot spot and the respective core.

The operation of FIG. 6 may be achieved through software remapping in operating system (OS) kernel code and managing the cache, instruction pointer and other dependencies of thread hopping accordingly. In other words, cache and instruction pointers may be copied from a first hardware thread to a second hardware thread before execution of the first hardware thread is stopped, thereby making the hop from the first hardware thread to the second hardware thread smooth while minimizing latency. This may help ensure that overall CPU temperature is maintained at a certain acceptable level while avoiding or minimizing thermal throttling and degradation in device performance associated with thermal throttling. By contrast, some conventional systems simply tear down a current thread and bring up the context of the new thread altogether fresh.

Of course, other criteria for hopping may be used as well. In this example, the amount of core resources required (e.g., voltage and frequency) by an application being more optimally available on other cores is another example criterion for hopping. For instance, if a minimum frequency and voltage of Core 0 is less than Core 2 and enough to support the current task, that may trigger thread hopping from Core 2 to Core 0 in order to minimize heat generation by choosing a core with lower voltage and frequency.

FIG. 7 is an illustration of thread hopping in system 600 in another scenario, according to one embodiment. For instance, the scope of embodiments includes more complicated thread hopping operations, such as moving multiple threads among multiple cores. Such concepts may be applied to other chips, such as in FIG. 3.

With respect to FIG. 7, consider an example of two cores, Core 0 and Core 1, with hardware thread 0 and hardware thread 1 active on these cores respectively. The example of FIG. 7 schedules the processing threads running on the multiple hardware threads on the multiple cores to increase efficiency of the multi-core processor 600. The example of FIG. 7 is described with respect to two options.

Beginning with Option 1, the thread scheduler may group processing threads running on multiple hardware threads on multiple cores onto a single core until each of the threads on that core are occupied. In this case the thread scheduler may reschedule processing threads on hardware thread 0 on Core 0 to hardware thread 0 on Core 1. Such operation may reduce the number of active cores to only a single core (Core 1 in this case), while the other cores may be power collapsed. Again the choice of core may be based in part on the current thermal hot spot (by reading data from temperature sensors) and information in Tables 400 and 500.

Moving to Option 2, the thread scheduler may move tasks from multiple different hardware threads from multiple different cores to hardware threads on a core which is farthest from a known thermal hot spot on the SOC and may have the lowest temperature of the cores at that particular time. In this example, the thread scheduler may reassign processing threads from hardware thread 0 on Core 0 and hardware thread 1 on Core 1 to hardware thread 0 on Core 2 and hardware thread 1 on Core 2, respectively. In other words, option 2 may include consolidating software threads. Based on multiple tasks running on multiple cores, the OS kernel may determine total resource requirements of the threads (e.g., operating frequency and operating voltage) and chooses a core based on the information in Tables 400 and 500 for efficient performance. For instance, in this example, Core 2 may be farthest from a GPU hot spot, and thus the thread scheduler may consolidate software threads from Cores 0 and 1 to Core 2 to reduce or minimize thermal effects from the GPU hot spot on the core to which the threads are assigned.

In another example, the first core operates at a minimum frequency of 100 MHz, second core operates at a minimum frequency of 200 MHz, and third core operates at a minimum frequency of 300 MHz (as in FIG. 4). According to FIG. 5, application X has a minimum operating frequency of 50 MHz, but by default, its threads were scheduled to Core 1 with a 200 MHz minimum operating frequency. After some time has elapsed, the thread scheduler hops the software threads to Core 0, having a minimum operating frequency of 100 MHz, upon determining that the hardware threads of Core 0 are idle. The core with a lower minimum operating frequency would generally be expected to operate at a lower voltage, thereby generating less heat. Such feature may help to reduce thermal throttling by reducing the amount of heat generated from the processing threads. Another feature of note is that in this example the process is proactive, so that the hopping is performed even without any temperature thresholds being reached.

Figure 8:
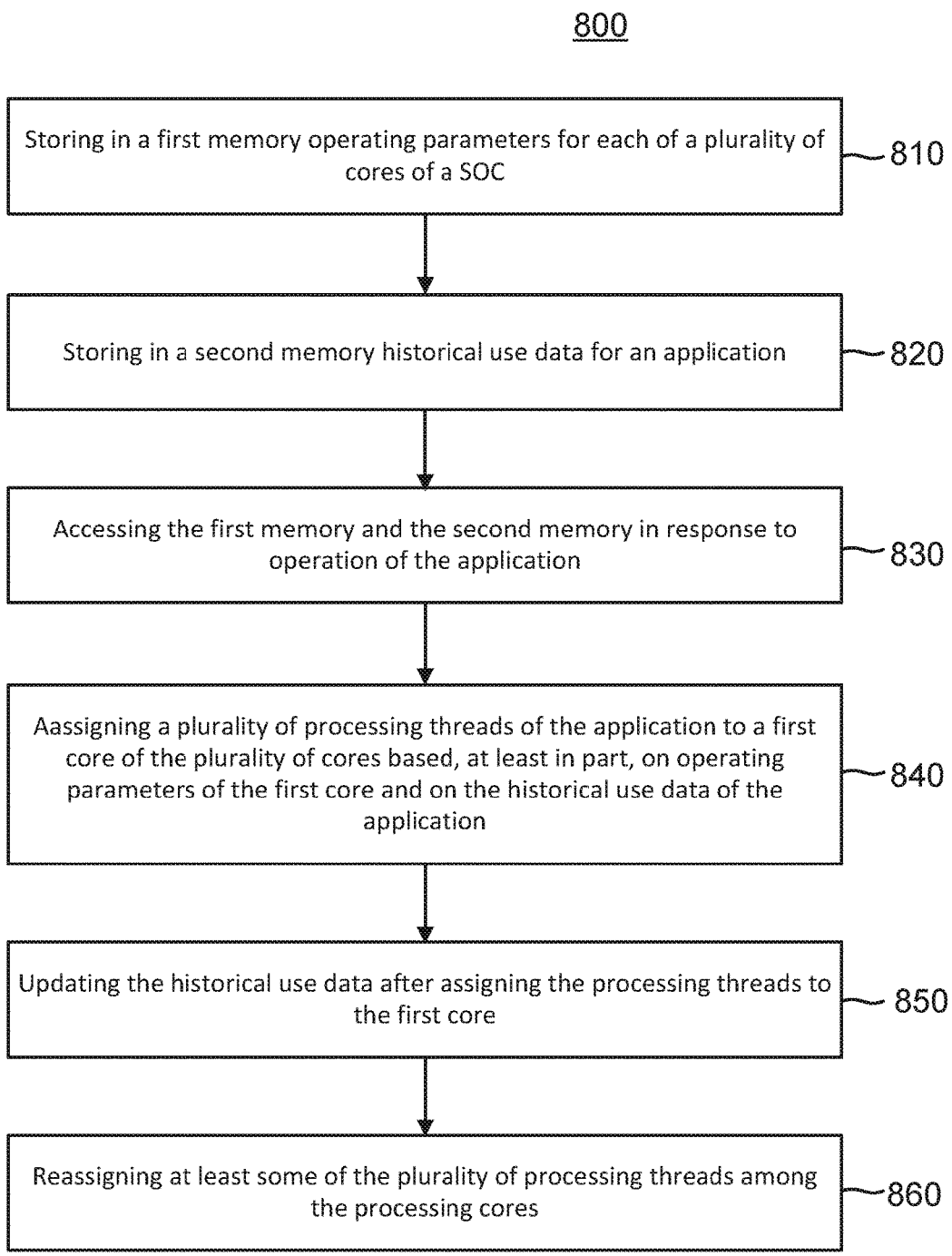
FIG. 8 is an illustration of a flow diagram of an example method of assigning and reassigning threads, according to one embodiment.

A flow diagram of an example method 800 for scheduling processing threads among the cores of a multi-core processing unit is illustrated in FIG. 8. In one example, method 800 is performed by a thread scheduler, which may include hardware and/or software functionality at a processor of the computing device. In some examples, a thread scheduler includes processing circuitry that executes computer readable instructions to receive processing threads and to place those processing threads into appropriate queues according to various criteria. As mentioned above, in one example, a thread scheduler includes functionality at an OS kernel, although the scope of embodiments is not so limited.

The embodiment of FIG. 8 includes performing actions 810-860 during normal operation and even at boot up of a chip, such as SOC 300 (FIG. 3). Further, the embodiment of FIG. 8 includes performing the method 800 to sign new processing threads. For instance, in some examples processing threads are assigned as applications are opened or as media is consumed.

In another example, the thread scheduler performs a load balancing operation to spread processing threads among the available cores to optimize efficiency. Such load balancing may be performed at regular intervals, e.g., every 50 ms. Of course, the scope of embodiments is not limited to any particular interval for performing load balancing. In these examples, re-assigning threads in method 800 may be performed at the regular interval for load balancing and also may be performed between the load balancing intervals as new processing threads are received by the thread scheduler as a result of new applications opening up or new media being consumed.

Although not explicitly shown in the actions 810-860 of FIG. 8, it is understood that the system may continually monitor temperature data, such as by receiving and analyzing data from temperature sensors spread among the components of the SOC.

At action 810 and 820, the OS kernel or other algorithm stores operating parameters for each of a plurality of cores of a SOC in a first memory and stores historical use data for an application to a second memory. For instance, in one example, the first memory and second memory are different memory structures, and in another example the first and second memory are sets of different addresses within a same memory structure. An example of a memory structure is memory 395 of FIG. 3. The operating parameters for the cores and the historical use data may be stored in any appropriate data structure, such as in the example Tables 400 and 500.

At action 830, the thread scheduler accesses the first and second memories in response to operation of the application. For instance, operation of the application may include a startup of the application or selection of additional options or consumption of media, generating new software threads to be assigned, or continuing operation of previously-assigned software threads.

Action 840 includes assigning a plurality of processing threads of the application to a first core of the plurality of cores based, at least in part, on operating parameters of the first core and on the historical use data of the application. Examples of operating parameters of the core include the information stored in the example Table 400 of FIG. 4, and examples of historical use data of the application include the information stored in example Table 500 and FIG. 5. Action 840 may include parsing the contents of such tables to access the operating parameters and historical use data and then placing the processing threads in one or more queues of the first core in response to analyzing the data. The first core may be selected according to various criteria, such as by using the example operating parameters and historical use data discussed above with respect to FIGS. 4 and 5.

In one example of action 840, the thread scheduler selects the first core for having a minimum operating frequency above an application minimum operating frequency, as given in the historical use data, and below a minimum operating frequency associated with a second core. For instance, if a particular application has a minimum operating frequency of 50 MHz, and a first core has a minimum operating frequency of 100 MHz, whereas a second core has a minimum operating frequency of 200 MHz, the thread scheduler may choose the first core because a lower operating frequency would generally be expected to result in less heat generation. Such selection would also leave the hardware threads of the 200 MHz core available for use by another application having a higher minimum operating frequency.

Similar to the example above, action 840 may include either additionally or alternatively selecting the first core for having a minimum operating voltage above an application minimum operating voltage, as given in the historical use data, and below a minimum operating voltage associated with a second core. Once again, a lower minimum operating voltage may be expected to result in less heat generation. Whether being assigned based on a lower minimum operating voltage or lower minimum operating frequency, a benefit of such feature is that it may minimize or reduce the likelihood of thermal throttling by reducing heat generated overall in the SOC.

In another example of action 840, the thread scheduler may place the processing threads in one or more queues of the first core in response to determining that a thermal gradient of the application is less likely to cause thermal throttling at the first core than at a second core. As an example, Table 500 and FIG. 5 includes thermal gradient as historical use data. The thermal gradient information may provide insight into how a particular application behaves in creating thermal hot spots within the SOC. Thus, in one example, action 840 includes programmatically comparing a location of a known hot spot (e.g. at a GPU), distance of the first and second core from the GPU (e.g., as in Table 400), and the thermal gradient to determine that the thermal gradient may be high enough to potentially cause thermal throttling if the threads were assigned to the second core, but that potential is less likely by the assigning the threads to the first core. A benefit of such feature is that it may minimize or reduce the likelihood that the threads would experience thermal throttling at their assigned core. Of course, the thermal gradient may be used in any appropriate way.

In another example of action 840, the operating parameters correlate each of the cores with respective physical distance to a known hot spot, e.g., a GPU. Thus, action 840 may include determining that the first core is a farthest one of the cores from the known hot spot, or at least further remote than is a second core, and then placing the processing threads in one or more queues of the first core in response thereto. An advantage of such feature is that it is generally expected that assigning threads to cores farthest from known hot spots may minimize or reduce the likelihood that heat attributed to the hot spot may result in thermal throttling for those newly-assigned threads (and vice versa).

Assigning the processing threads may include reassigning others of the processing threads. Examples for reassigning processing threads are given at FIGS. 6 and 7 and described above. Reassigning the processing threads may also take into account the operating parameters and historical use data, so that reassignments of threads may also be based, at least in part, on operating frequencies and voltages, distances from hot spots, operating voltages in frequencies, and the like.

At action 850, the OS kernel or other appropriate algorithm updates the historical use data after assigning the processing threads to the first core. Action 850 may include the OS kernel or other appropriate algorithm tracking the behavior of the processing threads after they are assigned, including observing a number of hardware threads used, a number of cores used, thermal gradients, and the like. To the extent that any of the observed information is different from the historical data, then the OS kernel or other appropriate algorithm may then update the data in the table, e.g., Table 500. Updating the table may be performed in response to determining that the particular data has changed, periodically, at each use of the particular application, or at other appropriate times. A benefit of such embodiments is that operation over time may reveal information about the application that would otherwise not be known, and the updated information may put the most up-to-date information to use in assigning processing threads to reduce heat generation and increase efficiency.

Action 860 includes reassigning at least some of the plurality of processing threads among the processing cores. This may include load rebalancing or thermal rebalancing and may be performed in response to temperature readings from temperature sensors, determining that particular hardware threads have become active or are newly idle, or the like. Examples of reassigning processing threads from core to core or from hardware thread to hardware thread are shown and discussed above with respect to FIGS. 6 and 7.

In a processing thread reassignment example, multiple hardware threads are active at same time, such as in FIG. 7. The thread scheduling algorithm accesses the table having core operating parameters to determine a minimum operating frequency and maximum operating frequency at Core 0, minimum and maximum operating frequencies at Core 1, and minimum and maximum operating frequencies at Core 2. In the example of FIG. 7, there are two cores active (Cores 0 and 1) at the beginning, and both have only one active hardware thread and another idle thread. Option 1 would allow power collapsing Core 0 by having both software threads be scheduled to the hardware threads of Core 1. Option 2 includes hopping the threads to Core 2. Before choosing either option 1 or option 2, the thread scheduler may check the minimum and maximum frequency requirements of the processing threads that would be hopped (e.g., by parsing Table 500). The thread scheduler then determines which core has a lowest minimum operating frequency value that is still acceptable for frequency and voltage. Then the thread scheduler hops the processing threads to the chosen core and power collapses the rest of the cores.

In one example, threads may be hopped when resources are more optimally available on another core. For instance, processing threads of an application may have been assigned to a first core, but a frequency of operation of a second core is lower than a frequency of operation of the first core and above a minimum operating frequency of the historical use data. Accordingly, the example may further include determining that one or more hardware threads are idle at the second core and then reassigning the processing threads to the one or more hardware threads at the second core in response to determining that the one or more hardware threads are idle. Thus, the trigger for the hopping may include determining other resources are idle and may have a lower operating voltage or frequency.

Another example may include hopping and grouping. Based on multiple tasks running on multiple cores, the thread scheduler may determine the total resource needed (e.g., frequency and voltage) and determine a core to use for grouping to optimize the performance. Continuing with this example, processing threads of the application may have been assigned to a first core, but a frequency of operation of a second core is lower than a frequency of operation of the first core and above a minimum operating frequency of the historical use data. There may also be a third core on which processing threads have been assigned, and the processing threads may correspond to the application or to another application. The thread scheduler may then reassign the processing threads from the first core to the second core and reassign additional processing threads from the third core to the second core. Then, after the reassigning, power collapsing the first core and the third core.

Additional reassignment examples may also take into account distance of a particular core from the known hot spot, thermal gradient of the application, and the like. A benefit of some embodiments is that they may reassign threads from time to time, even before a temperature threshold may be reached and before thermal throttling is performed. Heat generation may be spread among the different cores to minimize the likelihood that thermal throttling would be invoked. This may lead to better user experience overall, with higher operating speeds.

As the device operates during normal use, the core scheduling algorithm may continue to run, taking appropriate action as temperatures rise and fall and as threads are assigned or rebalanced.

The scope of embodiments is not limited to the specific method shown in FIG. 8. Other embodiments may add, omit, rearrange, or modify one or more actions. For instance, actions 810-860 may be performed multiple times during operation of the computing device, such as when new applications are opened or running applications are closed, as temperature changes affect the likelihood of throttling, as different hardware threads become either idle or active, and the like.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A system comprising:
a system on chip (SOC) having a plurality of cores;
a first memory storing operating parameters for each of the cores; and
a second memory storing historical use data for an application;
wherein:

processing threads of the application are assigned to one or more of the plurality of cores based, at least in part, on the operating parameters for each of the cores and the historical use data;
the operating parameters for each of the cores include a minimum operating voltage for each of the cores; and
the processing threads of the application are assigned to one or more of the plurality of cores based, at least in part, by selecting a first core having a minimum operating voltage above an application minimum operating voltage of the historical use data and below a minimum operating voltage associated with a second core.

2. The system of claim 1, wherein the processing threads of the application are assigned to the first core based, at least in part, by selecting the first core for having a minimum operating frequency above an application minimum operating frequency of the historical use data and below a minimum operating frequency associated with a third core.

3. The system of claim 1, wherein the operating parameters include hot spot location data for the plurality of cores, further wherein processing threads of the application are assigned to the first core based, at least in part, on the hot spot location data indicating the first core is further remote from a given hot spot than is a third core.

4. The system of claim 3, wherein the plurality of cores are included in a multi-core central processing unit (CPU), the system further comprising:
a graphics processing unit (GPU) on the SOC, wherein the given hot spot is located in the GPU.

5. The system of claim 1, wherein the operating parameters for each of the cores further includes a minimum operating frequency for each of the cores.

6. A method comprising:
storing in a first memory operating parameters for each of a plurality of cores of a system on chip (SOC);
storing in a second memory historical use data for an application;
accessing the first memory and the second memory in response to operation of the application; and
assigning a plurality of processing threads of the application to one or more of the plurality of cores based, at least in part, on operating parameters of each of the cores and on the historical use data of the application, wherein:
the operating parameters for each of the plurality of cores include a minimum operating voltage for each of the cores; and
assigning the plurality of processing threads comprises selecting a first core having a minimum operating voltage above an application minimum operating voltage of the historical use data and below a minimum operating voltage associated with a second core of the plurality of cores.

7. The method of claim 6, wherein assigning the plurality of processing threads comprises:
selecting the first core for having a minimum operating frequency above an application minimum operating frequency of the historical use data and below a minimum operating frequency associated with a third core of the plurality of cores.

8. The method of claim 6, wherein the historical use data includes a plurality of entries correlating each application with respective thermal gradient information.

9. The method of claim 8, wherein assigning the plurality of processing threads further comprises:

placing the processing threads in one or more queues of the first core in response to determining that a thermal gradient of the application is less likely to cause thermal throttling at the first core than at a third core.

10. The method of claim 6, wherein the operating parameters include a plurality of entries correlating each of the cores with respective physical distances to a known hot spot.

11. The method of claim 10, wherein assigning the plurality of processing threads further comprises:
placing the processing threads in one or more queues of the first core in response to determining that the first core is a farthest one of the plurality of cores from a known hot spot.

12. The method of claim 6, wherein the plurality of cores are included in a central processing unit (CPU), and wherein the method is performed by an operating system kernel running on the CPU.

13. The method of claim 6, further comprising:
updating the historical use data after assigning the processing threads to the first core.

14. The method of claim 6, wherein a frequency of operation of a third core is lower than a frequency of operation of the first core and above a minimum operating frequency of the historical use data, the method further comprising:
determining that one or more hardware threads are idle at the third core; and
reassigning one or more of the processing threads to the one or more hardware threads at the third core in response to determining that the one or more hardware threads are idle.

15. The method of claim 6, wherein a frequency of operation of a third core is lower than a frequency of operation of the first core and above a minimum operating frequency of the historical use data, and wherein the frequency of operation of the third core is lower than a frequency of operation of a fourth core, the method further comprising:
reassigning the processing threads from the first core to the third core and reassigning additional processing threads from the fourth core to the third core; and
after reassigning the processing threads and the additional processing threads to the third core, power collapsing the first core and the fourth core.

16. The method of claim 6, wherein the operating parameters for each of the plurality of cores further includes a minimum operating frequency for each of the cores.

17. A non-transitory machine-readable medium having stored thereon instructions for performing a method, the medium comprising machine executable code which when executed by at least one processor, causes the at least one processor to:
store in a first memory operating parameters for each of a plurality of cores of a system on chip (SOC);
store in a second memory historical use data for an application;
access the first memory and the second memory in response to operation of the application; and
assign a plurality of processing threads of the application to a first core of the plurality of cores based, at least in part, on operating parameters of the first core and on the historical use data of the application, wherein:
the operating parameters for each of the plurality of cores include a minimum operating voltage for each of the cores and a minimum operating frequency for each of the cores; and assigning the plurality of processing threads comprises selecting the first core having a minimum operating voltage above an application minimum operating voltage of the historical use data and below a minimum operating voltage associated with a second core of the plurality of cores.

18. The non-transitory machine-readable medium of claim 17, wherein assigning the plurality of processing threads comprises:
selecting the first core for having a minimum operating frequency above an application minimum operating frequency of the historical use data and below a minimum operating frequency associated with a third core of the plurality of cores.

19. The non-transitory machine-readable medium of claim 17, wherein the historical use data includes a plurality of entries correlating each of the cores with respective thermal gradient information.

20. The non-transitory machine-readable medium of claim 19, wherein assigning the plurality of processing threads further comprises:
placing the processing threads in one or more queues of the first core in response to determining that a thermal gradient of the application is less likely to cause thermal throttling at the first core than at a third core.

21. The non-transitory machine-readable medium of claim 17, wherein a frequency of operation of a third core is lower than a frequency of operation of the first core and above a minimum operating frequency of the historical use data, wherein the medium comprising machine executable code which when executed by the at least one processor, causes the at least one processor to:
determine that one or more hardware threads are idle at the third core; and
reassign one or more of the processing threads to the one or more hardware threads at the third core in response to determining that the one or more hardware threads are idle.

22. The non-transitory machine-readable medium of claim 17, wherein a frequency of operation of a third core is lower than a frequency of operation of the first core and above a minimum operating frequency of the historical use data, and wherein the frequency of operation of the third core is lower than a frequency of operation of a fourth core, wherein the medium comprising machine executable code which when executed by at the least one processor, causes the at least one processor to:
reassign the processing threads from the first core to the third core and reassign additional processing threads from the fourth core to the third core; and
after reassigning the processing threads and the additional processing threads to the third core, power collapse the first core and the fourth core.

23. A wireless device comprising:
a system on chip (SOC) having a plurality of cores;
means for storing operating parameters for each of the cores;
means for storing historical use data for an application; and
means for assigning processing threads of the application to one or more of the plurality of cores based, at least in part, on the operating parameters for each of the cores and the historical use data, wherein:
the operating parameters for each of the plurality of cores include a minimum operating voltage for each of the cores; and
the processing threads of the application are assigned by the assigning means based, at least in part, by selecting a first core having a minimum operating voltage above an application minimum operating voltage of the historical use data and below a minimum operating voltage associated with a second core.

24. The wireless device of claim 23, wherein the plurality of cores are included in a central processing unit (CPU) on the SOC, and wherein the assigning means comprise an operating system kernel running on the CPU.

25. The wireless device of claim 23, wherein the processing threads of the application are assigned by the assigning means based, at least in part, by selecting the first core for having a minimum operating frequency above an application minimum operating frequency of the historical use data and below a minimum operating frequency associated with a third core.

26. The wireless device of claim 23, wherein the operating parameters for each of the cores further includes a minimum operating frequency for each of the cores.

27. A method comprising:
storing in a first memory operating parameters for each of a plurality of cores;
storing in a second memory historical use data for an application;
accessing the first memory and the second memory in response to operation of the application; and
assigning a plurality of processing threads of the application to a first core of the plurality of cores based, at least in part, on operating parameters of the first core and on the historical use data of the application, wherein the historical use data includes a plurality of entries correlating each application with respective thermal gradient information.

28. The method of claim 27, wherein assigning the plurality of processing threads further comprises:
placing the processing threads in one or more queues of the first core in response to determining that a thermal gradient of the application is less likely to cause thermal throttling at the first core than at a second core.

29. A method comprising:
storing in a first memory operating parameters for each of a plurality of cores;
storing in a second memory historical use data for an application;
accessing the first memory and the second memory in response to operation of the application; and
assigning a plurality of processing threads of the application to a first core of the plurality of cores based, at least in part, on operating parameters of the first core and on the historical use data of the application, wherein the operating parameters include a plurality of entries correlating each of the cores with respective physical distances to a known hot spot.

30. The method of claim 29, wherein assigning the plurality of processing threads further comprises:
placing the processing threads in one or more queues of the first core in response to determining that the first core is a farthest one of the plurality of cores from a known hot spot.

* * * * *